United States Patent
Belchee et al.

(10) Patent No.: US 12,524,747 B2
(45) Date of Patent: Jan. 13, 2026

(54) SYSTEMS AND METHODS FOR PROXIMITY-BASED TRANSACTION LIMIT THRESHOLD OVERRIDE

(71) Applicant: Wells Fargo Bank, N.A., San Francisco, CA (US)

(72) Inventors: William Blakely Belchee, Charlotte, NC (US); Matthew S. Brookshire, Cottonwood Heights, UT (US); John Andrew Chuprevich, Davidson, NC (US); Daniel Sanford, Charlotte, NC (US); Christopher Gaston Seagram, Frisco, TX (US); Matthew N. Wheeler, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 11 days.

(21) Appl. No.: 18/599,711

(22) Filed: Mar. 8, 2024

(65) Prior Publication Data

US 2025/0285091 A1    Sep. 11, 2025

(51) Int. Cl.
  *G06Q 20/10*    (2012.01)
  *G06Q 20/40*    (2012.01)

(52) U.S. Cl.
  CPC ......... *G06Q 20/10* (2013.01); *G06Q 20/4014* (2013.01); *G06Q 20/4015* (2020.05)

(58) Field of Classification Search
  USPC ......................................................... 705/44
  See application file for complete search history.

(56) References Cited

U.S. PATENT DOCUMENTS

| | | | |
|---|---|---|---|
| 8,584,219 B1 * | 11/2013 | Toole | H04L 69/24 726/25 |
| 9,082,117 B2 | 7/2015 | Chin | |
| 10,269,004 B2 | 4/2019 | Tyler et al. | |
| 10,395,237 B2 | 8/2019 | Basheerahammed et al. | |
| 10,885,522 B1 * | 1/2021 | Brock | G06Q 20/20 |
| 11,429,977 B2 * | 8/2022 | Elfeky | G06Q 20/405 |
| 11,568,419 B1 * | 1/2023 | Van Cleave | G06Q 50/14 |

(Continued)

FOREIGN PATENT DOCUMENTS

| | | |
|---|---|---|
| CN | 105378771 | 3/2016 |
| CN | 105593883 | 2/2020 |

(Continued)

*Primary Examiner* — William E Rankins
(74) *Attorney, Agent, or Firm* — SCHWEGMAN LUNDBERG & WOESSNER, P.A.

(57) ABSTRACT

A method may include receiving, using a processing unit at a service endpoint, from a first computing device a request to initiate a transfer from a first account to a second account, the request identifying a transfer amount; determining, using the processing unit, that the transfer amount exceeds a stored threshold transfer limit; receiving an identifier associated with the second account; subsequent to the determining, receiving, using the processing unit, an indication that a geographic location override action has been completed between the first computing device and a second computing device, the second computing device stored as associated with the second account; and in response to receiving the indication, increasing the threshold transfer limit between the first computing device and second computing device for a period of time and authorizing the transfer.

20 Claims, 6 Drawing Sheets

(56) References Cited

U.S. PATENT DOCUMENTS

| | | |
|---|---|---|
| 11,580,517 B1 * | 2/2023 | Dietrich ............... G06Q 20/322 |
| 11,580,562 B2 * | 2/2023 | Song ..................... G06Q 30/02 |
| 11,900,341 B1 * | 2/2024 | Chiu .................. G06Q 20/3821 |
| 2005/0222961 A1 | 10/2005 | Staib et al. |
| 2007/0255652 A1 | 11/2007 | Tumminaro et al. |
| 2008/0222711 A1 | 9/2008 | Michaelis |
| 2010/0082481 A1 | 4/2010 | Lin et al. |
| 2016/0086186 A1 * | 3/2016 | Candelore .......... G06Q 20/3278 |
| | | 705/44 |
| 2016/0117650 A1 * | 4/2016 | Weidenmiller ...... G06Q 20/405 |
| | | 705/44 |
| 2017/0255920 A1 | 9/2017 | Prakash et al. |
| 2018/0068293 A1 | 3/2018 | Dunne |
| 2019/0325422 A1 * | 10/2019 | Chatterjee .............. G06Q 30/06 |
| 2023/0169512 A1 * | 6/2023 | Rendheer ................ G06N 5/02 |
| | | 705/44 |

FOREIGN PATENT DOCUMENTS

| | | |
|---|---|---|
| KR | 101957840 | 3/2019 |
| RU | 2523304 | 7/2014 |
| WO | 2015062256 | 5/2015 |

* cited by examiner

SYSTEMS AND METHODS FOR PROXIMITY-BASED TRANSACTION LIMIT THRESHOLD OVERRIDE

BACKGROUND

Digital transaction systems impose transfer limits due to the challenges in verifying the parties' identities. These systems, operating with limited identity confirmation capabilities, actively enforce restrictions to safeguard against fraud. This approach, while protective, may hinder legitimate transactions that require higher transfer values.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Like numerals having different letter suffixes may represent different instances of similar components. Some embodiments are illustrated by way of example, and not limitation, in the figures of the accompanying drawing.

DETAILED DESCRIPTION

Figure 1:
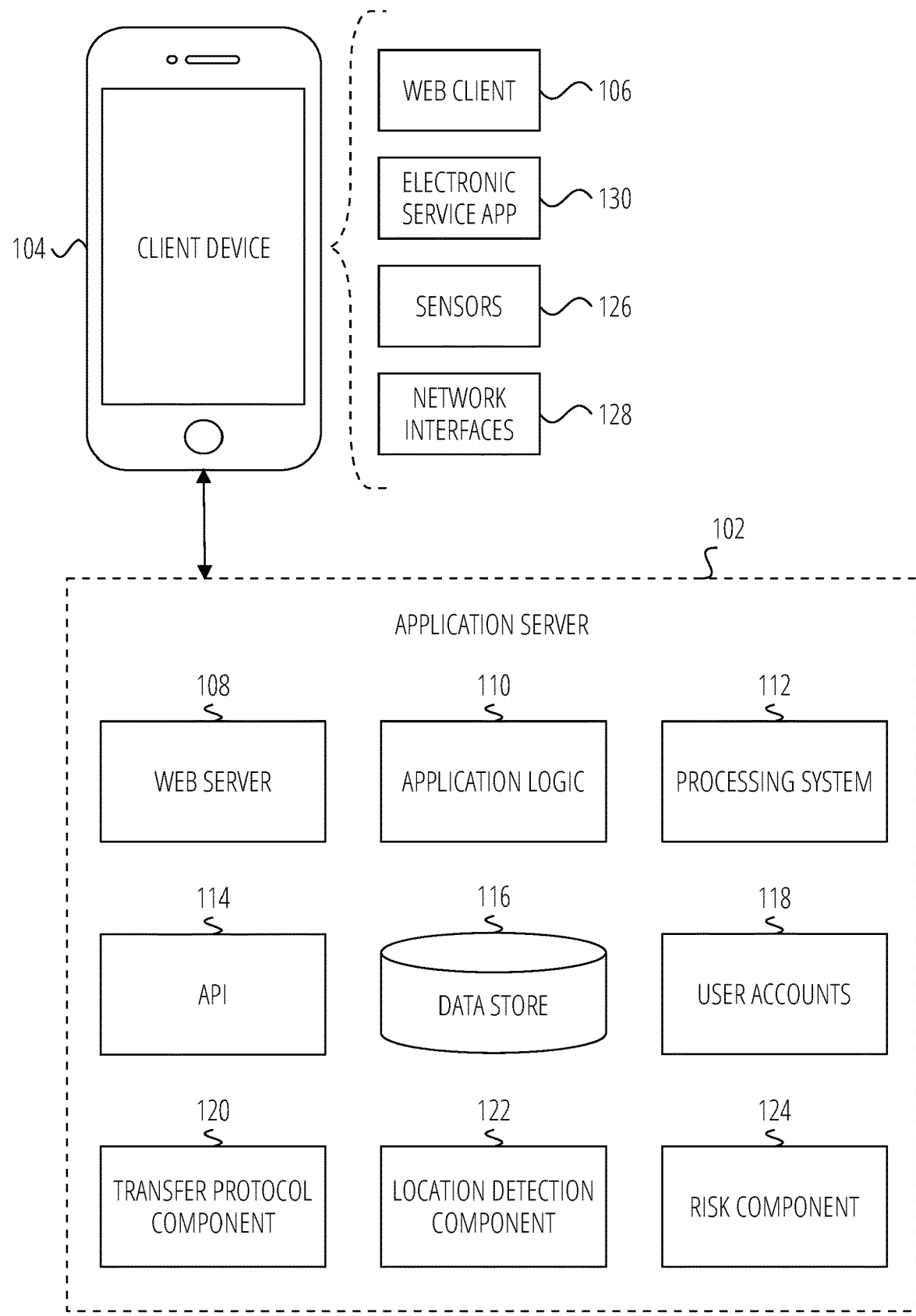
FIG. 1 is an illustration of components of a client device and an application server, according to various examples.

In traditional in-person financial exchanges involving physical currency, many of the technical challenges present in digital transactions are naturally mitigated by the physical presence of the parties involved. When two individuals engage in a transaction face-to-face, the identity of each party is typically apparent and can be confirmed through direct interaction and visual confirmation. The physical exchange of cash or checks does not require electronic authentication protocols or a third-party service, as the tangible nature of the transaction itself serves as a form of verification.

Moreover, the risk of fraud in physical exchanges is reduced by the immediacy and transparency of the transaction. Both parties are present to witness the exchange, count the currency, and confirm the transaction's completion on the spot. There is no need for complex digital security measures because the transaction is self-authenticating.

However, these natural assurances disappear when transactions move to the digital realm and new challenges arise. Digital transactions lack the inherent trust and verification present in physical exchanges. There is no way for a server to visually confirm the person's identity on the other side of the transaction. This disconnect creates opportunities for fraud. Additionally, transaction limits may be used to reduce the overall risk to the parties involved. In this manner, the amount lost by any given party is capped if fraud does occur.

The fraud mitigation methods (such as transaction limits) limit the capabilities of users to enact transactions—even if the digital transaction occurs between two entities that are near each other. For example, consider that a first person hires a second person to perform a service such as replacing a garage door. The service's total cost may exceed the daily transfer limit of an electronic transaction service. Accordingly, if the first person does not have enough cash to cover the cost, they may write a check. However, the checking process has risks, as the second person cannot confirm the check's validity.

The systems and methods described address these digital-specific challenges in several manners. For example, a system may monitor the proximity of devices involved in a transaction using an electronic transaction service. Furthermore, when a user initiates the transaction, the system may authenticate the users' identities associated with the transaction. Suppose the system determines the devices are within a threshold distance. In that case, a message may be presented to the user that offers the user the chance to override a daily transaction limit.

Authenticating the devices and location may be performed differently, such as by completing specific actions. For example, the action may be a physical gesture, such as a near-field communication (NFC) tap, or a digital interaction, such as scanning a QR code. If this action is completed successfully, the system may recognize the scenario and temporarily increase the transaction limit, allowing the transaction to proceed.

The system's design acknowledges that while digital transactions offer convenience and speed, they also introduce unique vulnerabilities that do not exist in physical exchanges. The use of proximity verification and device authentication bridges the gap between the security of in-person transactions and the flexibility of digital financial services. Furthermore, it implements variations of the trust-building elements of physical exchanges, such as identity verification and fraud prevention, while solving problems specific to the digital realm.

In the following description, for purposes of explanation, numerous specific details are outlined to provide a thorough understanding of some example embodiments. It will be evident, however, to one skilled in the art that the present invention may be practiced without these specific details.

Throughout this disclosure, components may perform electronic actions in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. The presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples, these portions may be displayed on a screen simultaneously, in others, the portions/elements may be displayed on separate screens such that not all portions/elements are displayed simultaneously. Unless explicitly indicated as such, the use of "presenting a user interface" does not infer either one of these options.

Additionally, the elements and portions are sometimes described as being configured for a particular purpose. For example, an input element may be configured to receive an input string. In this context, "configured to" may mean presenting a user interface element capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query to a database.

FIG. 1 is an illustration of components of a client device and an application server, according to various examples. FIG. 1 includes an application server 102, a client device 104, a web client 106, a web server 108, an application logic 110, a processing system 112, an application programming interface (API) 114, a data store 116, a user accounts 118, a transfer protocol component 120, a location detection component 122, a risk component 124, sensors 126, a network interfaces 128, and an electronic service app 130.

Application server 102 is illustrated as separate elements (e.g., components). However, the functionality of individual elements may be performed by a single element. An element may represent computer program code executable by processing system 112. The program code may be stored on a storage device (e.g., data store 116) and loaded into the memory of the processing system 112 for execution. Portions of the program code may be executed in parallel across multiple processing units. A processing unit may be one or more of a core of a general-purpose computer processor, a graphical processing unit, an application-specific integrated circuit, or a tensor processing core operating a single device or multiple devices. Accordingly, code execution using a processing unit may be performed on a single device or distributed across multiple devices. In some examples, using shared computing infrastructure, the program code may be executed on a cloud platform (e.g., MICROSOFT AZURE® and AMAZON EC2®).

Client device 104 may be a computing device which may be but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

In various examples, the web client 106 may act as an interface for users to interact with the application server 102. It may be responsible for presenting the user with web-based forms and interfaces for initiating transfers, viewing account balances, and receiving notifications regarding transfer limits. The web client 106 may also be configured to securely transmit transaction requests to the application server 102 and display responses related to the transfer process.

A user may install apps on their devices. For example, a user may use the app store associated with the platform of client device 104 to install electronic service app 130. As part of the installation, the electronic service app 130 may request authorization from the user to access data from the sensors 126. The sensors 126 may include GPS, NFC, Bluetooth, or other proximity sensors that enable the client device 104 to participate in location-based verification processes (described further herein). The functionality described for the electronic service app 130 may also be performed by the web client 106. Indeed, in various examples, a web client 106 may be part of the electronic service app 130.

In various examples, the electronic service app 130 may be used to manage financial transactions between users. Upon launching the app, a user may be prompted to log in, which may be facilitated through various authentication methods. The app may support traditional password-based authentication, biometric verification such as fingerprint scanning or facial recognition, or two-factor authentication for enhanced security.

Once logged in, the electronic service app 130 may present a dashboard or home screen that summarizes a user's account, including current balance and recent transaction activity. To initiate a transfer, the user may select an option to 'Transfer Money' or 'Send Payment' from the menu. The app may then prompt the user to specify the recipient of the funds. For example, the user may manually enter the recipient's account details, enter the recipient's phone number, select from a list of recent or saved payees, or use the device's contact list to choose another user.

After selecting a recipient, the user may be asked to enter the amount they wish to transfer. The electronic service app 130 may display the current transaction limit and inform the user if the entered amount exceeds this limit. If the transaction is within the limit, the user may proceed to review the transaction details and confirm the transfer. If the amount exceeds the limit, the electronic service app 130 may guide the user through actions to potentially increase the limit, such as performing proximity verification if both parties' devices are nearby, as described in more detail below.

In various examples, the network interfaces 128 (e.g., cellular, Wi-Fi, NFC) may support various communication protocols to maintain a connection with the application server 102 or other client devices. The network interfaces 128 may also facilitate the exchange of verification signals and other location or gesture data between the client device 104 and the application server 102.

Client device 104 and application server 102 may communicate via a network (not shown). The network may include local-area networks (LAN), wide-area networks (WAN), wireless networks (e.g., 802.11 or cellular network), Public Switched Telephone Network (PSTN) Net, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN) or combinations of LANs or WANs, such as the Internet.

In some examples, the communication may occur using an application programming interface (API) such as API 114. An API provides a method for computing processes to exchange data. A web-based API (e.g., API 114) may permit communications between two or more computing devices, such as a client and a server. The API may define a set of HTTP calls according to Representational State Transfer (RESTful) practices. For example, A RESTful API may define various GET, PUT, POST, and DELETE methods to create, replace, update, and delete data stored in a database (e.g., data store 116).

APIs may also be defined in frameworks provided by an operating system (OS) to access data in an application that an application may not regularly be permitted to access. For example, the OS may define an API call to obtain the current location of a mobile device the OS is installed on. In another example, an application provider may use an API call to request a be authenticated using a biometric sensor on the mobile device. By segregating any underlying biometric data—e.g., by using a secure element—the risk of unauthorized transmission of the biometric data may be lowered.

Application server 102 may include web server 108 to enable data exchanges with client device 104 via web client 106. Although generally discussed in the context of delivering webpages or other data via the Hypertext Transfer Protocol (HTTP), other network protocols may be utilized by web server 108 (e.g., File Transfer Protocol, Telnet, Secure Shell, etc.). A user may enter a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 108. In response, web server 108 may transmit a web page rendered on a client device's display device (e.g., a mobile phone, desktop computer, etc.).

Additionally, web server 108 may enable users to interact with one or more web applications provided in a transmitted web page or installed app (e.g., electronic service app 130). A web application may provide user interface (UI) components that are rendered on a display device of client device 104. The user may interact (e.g., select, move, enter text into) with the UI components, and, based on the interaction, the web application may update one or more portions of the web page or app. A web application may be executed in whole or in part locally on client device 104. The web application may populate the UI components with data from external sources or internal sources (e.g., data store 116) in various examples.

The web application may be executed according to application logic 110. Application logic 110 may use the various elements of application server 102 to implement the web application. For example, application logic 110 may issue API calls to retrieve or store data from data store 116 and transmit it for display on client device 104. Similarly, data entered by a user into a UI component may be transmitted using API 114 back to the web server. Application logic 110 may use other elements (e.g., transfer protocol component 120, location detection component 122, risk component 124, etc.) of application server 102 to perform functionality associated with the web application as described further herein.

Data store 116 may store data that is used by application server 102. Data store 116 is depicted as a singular element but may in actuality, be multiple data stores. The specific storage layout and model used in by data store 116 may take several forms-indeed, a data store 116 may utilize multiple models. Data store 116 may be, but is not limited to, a relational database (e.g., SQL), a non-relational database (NoSQL), a flat-file database, an object model, a document details model, a graph database, a shared ledger (e.g., blockchain), or a file system hierarchy. Data store 116 may store data on one or more storage devices (e.g., a hard disk, random access memory (RAM), etc.). The storage devices may be in standalone arrays, part of one or more servers, and located in one or more geographic areas. Data structures may be implemented in several manners depending on the programming language of an application or database management system used by an application. For example, if C++ is used, the data structure may be implemented as a struct or class. In the context of a relational database, a data structure may be defined in a schema.

User accounts 118 may include user profiles on users of application server 102. A user profile may include credential information such as a username and hash of a password. A user may enter their username and plaintext password on a login page of application server 102 to view their user profile information or interfaces presented by application server 102 in various examples. Within user accounts 118, users may be able to update their login credentials. This may involve changing their username or password through a 'Profile' or 'Account Settings' section. The application server 102 may process these changes and update the account details accordingly.

Users may create and manage a list of contacts within the electronic service app 130. This list may be populated by manually adding contact information for each individual, such as their name, associated email, or phone number. Alternatively, the app may offer the option to import contacts from the user's device, subject to the user's permission. The application server 102 may store this contact information in association with the user's account in user accounts 118.

To enable the transfer of funds, a user account in user accounts 118 may be linked to one or more financial accounts. Users may link their bank accounts, credit cards, or other financial instruments by providing identifying information such as account numbers, routing numbers, and any required verification information in the electronic service app 130. The application server 102 may work with financial institutions (e.g., via API calls) to verify the accounts and establish secure connections for transferring funds. For example, authorization for access to the account may include a token (e.g., using OAuth) or login credentials that authorize application server 102 to retrieve financial data from the other services in a defined format such as JavaScript Object Notation (JSON) or extensible markup language (XML) over an API.

In addition to a financial account and contact list, a user account may identify a set of devices. In various examples, a user interface may be presented within electronic service app 130 to initiate a device registration process. The application server 102 may respond by generating a verification code or token securely transmitted to a user's contact method, such as an email address or mobile number associated with the user's account.

Upon receipt and entry of the verification code by the user into the electronic service app 130, the app may capture and relay the new device's unique identifiers, including but not limited to the IMEI or MAC address, to the application server 102. The application server 102 may further enrich this data with additional device-specific attributes, such as the make and model of the device, the operating system version, and the specific version of the electronic service app 130 in use.

The data store 116 may be structured to maintain a relational mapping between user accounts and their respective devices. Upon successfully validating and associating the new device with the user's account, the data store 116 may update the relevant records to reflect this addition. The application server 102, upon confirmation of the update from the data store 116, may dispatch an acknowledgment to the electronic service app 130, culminating in a notification to the user that the device registration has been successfully completed.

In various examples, the application server 102 may automatically suggest that a new device be associated with a user's account. This may occur when the user logs into their account from a new device for the first time. The application server 102 may detect the new device and prompt the user to confirm if they wish to add it to their list of trusted devices, initiating the verification mentioned above process.

"Associated" in the context of linking a device to a user account (or other data linkages described herein) may be implemented in different manners depending on the underlying database system. For example, in a relational database management system (RDBMS), the term "associated" may refer to the relationship between tables. The relationship could be one-to-one, one-to-many, or many-to-many, established through foreign key constraints. For example, in a one-to-many relationship, a record in Table A (e.g., the user account table) may be associated with multiple devices in Table B (e.g., a device table), using a foreign key in Table B that references the primary key in Table A.

Within application server 102, the transfer protocol component 120, the location detection component 122, and the risk component 124 facilitate transfers between user accounts. The transfer protocol component 120 may respond when a user initiates a transfer request via the electronic service app 130. A transfer request may be received via API 114. For example, the API call may be a POST request with a JSON payload containing key-value pairs that specify the user account identifier of the sender, the user account identifier of the receiver, the transaction amount, and the device identifier of the client device 104 initiating the request. The device identifier may be a unique token or identifier associated with the client device 104. It may be stored as part of the user's account, ensuring the request is authenticated and originates from a trusted source.

The data included in the transfer request may be used by the risk component 124 to determine whether the transfer may proceed. For example, the risk component 124 may evaluate the transfer amount. If the transfer amount exceeds a threshold transfer limit, the transfer may initially be denied. However, the denial may be overcome if a geographic location override action is completed. A geographic location override action may be an action taken by the user to confirm that the computing device used to initiate the transaction (e.g., the sending computing device) and the computing device of the person that is receiving the transaction (e.g., the receiving computing device) are within a certain proximity of each other.

Figure 2:
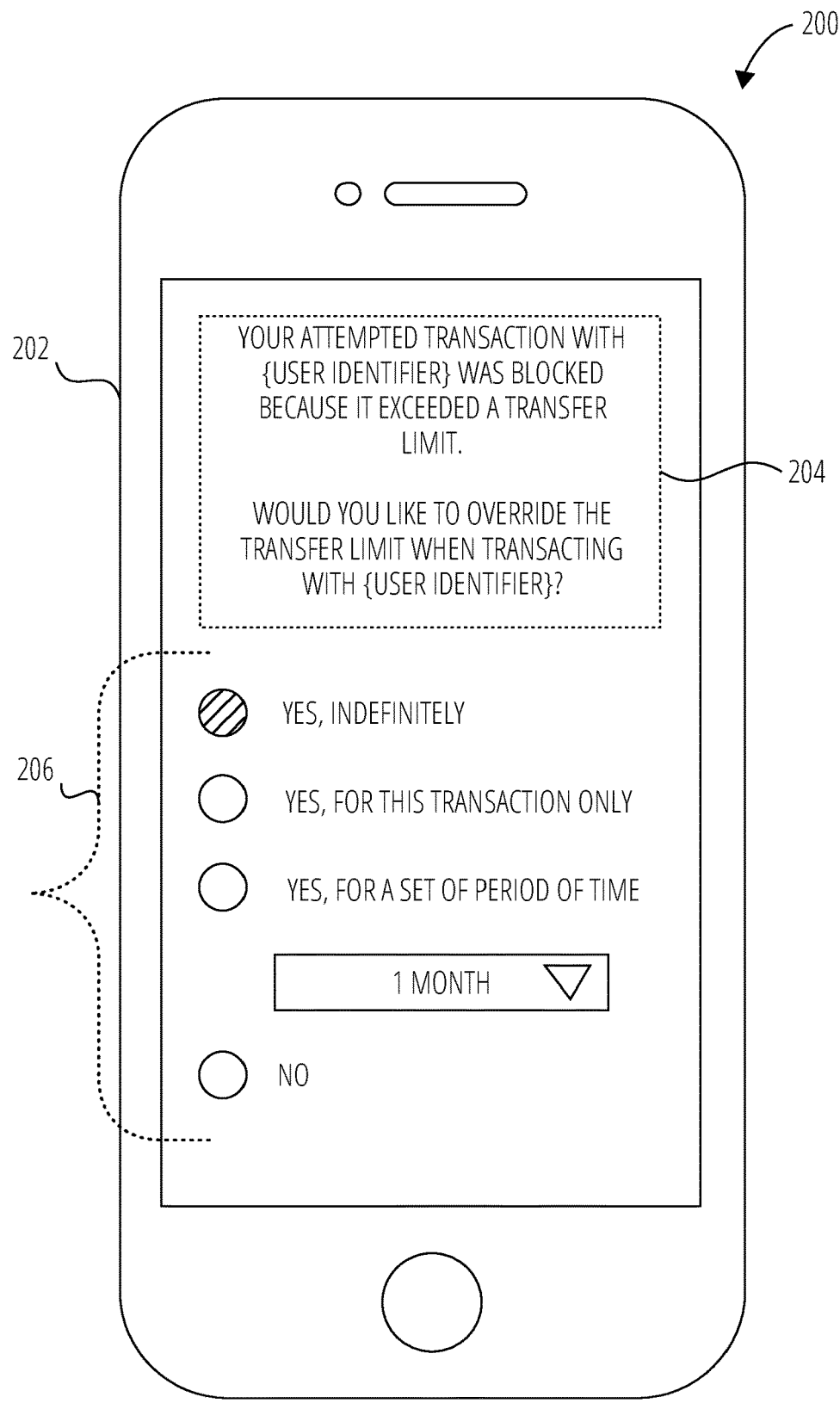
FIG. 2 is a client device with an override user interface, according to various examples.
Figure 3:
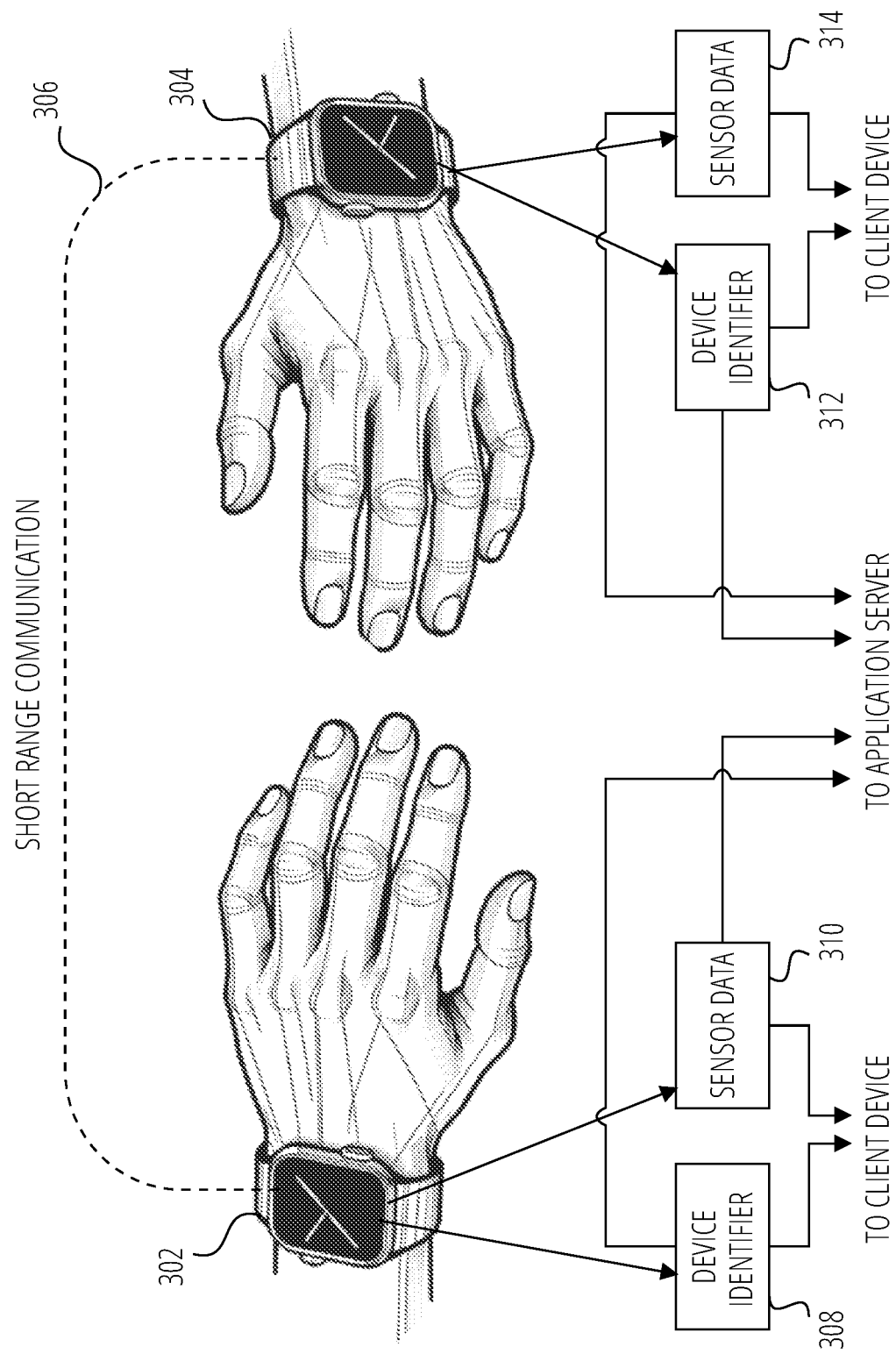
FIG. 3 is a schematic diagram of an exchange of data between two devices, according to various examples.
Figure 4:
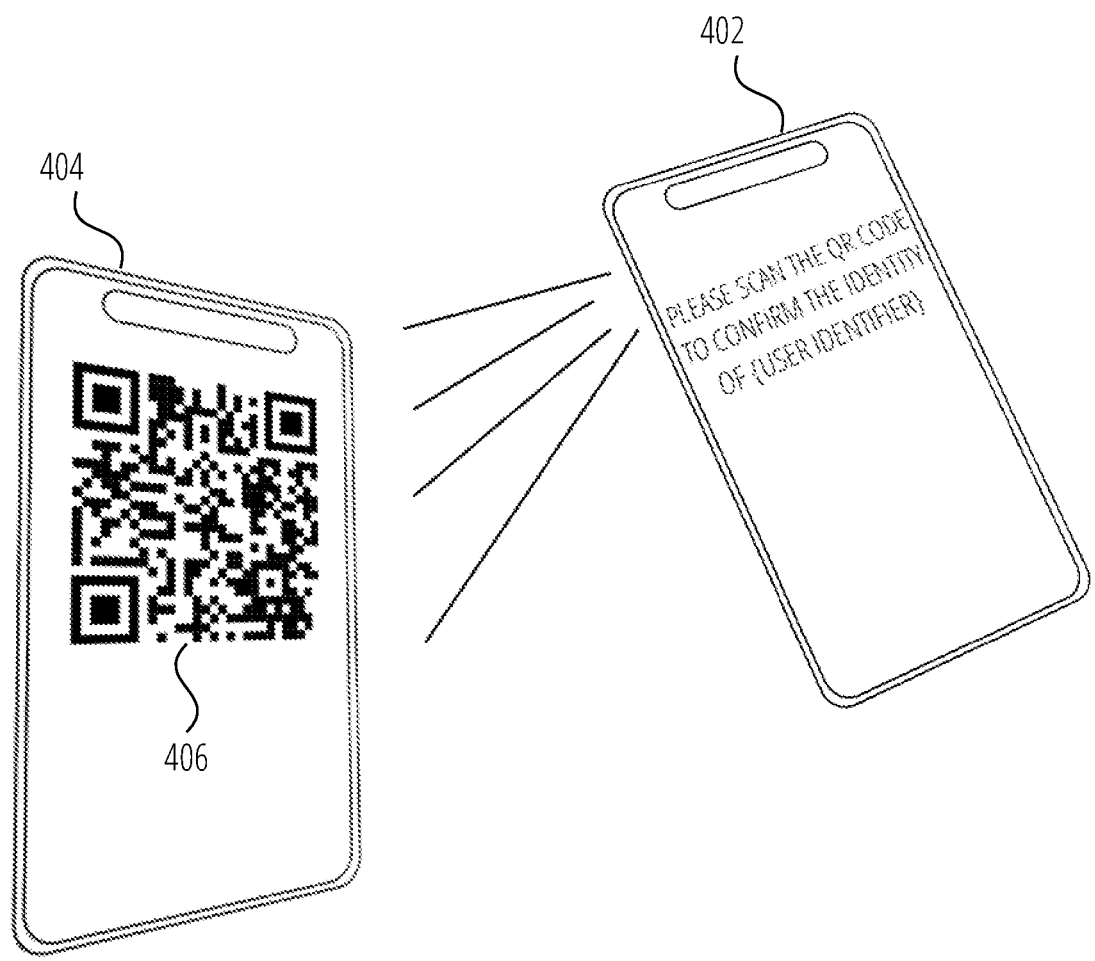
FIG. 4 is an illustration of scanning on a graphical identifier, according to various examples.

In various examples, the geographic location override action is partly taken by application server 102 via location detection component 122. For example, location detection component 122 may detect the locations of the two computing devices (e.g., by receiving location data). If the locations are within a threshold distance, an override request message may be transmitted to the sending computing device requesting authorization to override the threshold transfer limit. FIG. 2, FIG. 3, and FIG. 4 describe the process of geographic location override actions in greater detail.

FIG. 2 is a client device with an override user interface 200, according to various examples. FIG. 2 includes a client device 202, an override request message 204, and override options 206. The client device 202 may be similar to the client device 104 in FIG. 1.

The override user interface 200 may be transmitted to the client device 202 when risk component 124 detects a threshold transfer limit has been exceeded and at least one geographic location override action has been completed. For example, if the location detection component 122 has determined the two devices associated with a transfer request are within a 50-foot radius of each other, the override user interface 200 may be presented.

In other examples, the override user interface 200 may be presented to the user before any geographic location override action. In such instances, the override user interface 200 may be presented as the first in a series of user messages. For example, suppose a user decides to override the transfer limit. In that case, a subsequent message may be presented identifying the geographic location override actions that may be completed to override the threshold transfer limit.

The override request message 204 is an example template of a message that may be presented to the user on the client device that initiated the transfer request. As illustrated, the message informs the user why their transaction was blocked and includes a user identifier associated with the receiving party. In this manner, if the user of the client device 202 does not recognize the provided user identifier, the user may quickly ascertain the transaction request is fraudulent and not proceed with the override.

In various examples, a user may select one of the options in the override options 206. The user's selection may be captured by the client device 202 and transmitted back to the application server 102 through an API call. The risk component 124, upon receiving the user's selection, may update the user accounts 118 within the data store 116. For example, risk component 124 may generate override entries in the data store 116 that reflect the user's chosen override option. For instance, if the user selects to override the limit for a single transaction, a temporary override entry allows the current transaction to proceed without hindrance from the risk component 124. If the user chooses to override the limit indefinitely or for a set period, a more persistent override entry is created, including the override duration.

The override entries in the data store 116 may be associated with user account identifiers of both the sender and the receiver involved in the transaction. The override entries may be structured to include metadata such as the start time of the override, the duration, and any specific conditions or parameters that apply to the override, such as the maximum amount allowed during the override period.

Subsequent transactions initiated between the two user accounts may then be processed per the override entries. When a new transfer request is received, the risk component 124 queries the data store 116 to check for any active overrides associated with the user accounts involved. Suppose an override is in effect, and the conditions of the current transaction fall within the parameters of the override. In that case, the risk component 124 allows the transaction to proceed, even if it exceeds the threshold transfer limit.

The risk component 124 may be configured to automatically revert to the standard threshold transfer limit upon the expiration of the override duration, as indicated by the entries in the data store 116. For example, the risk component 124 may periodically (e.g., daily) monitor the time-based conditions of each override entry and update (e.g., remove if the time period has lapsed) the user accounts 118 and data store 116 accordingly, ensuring that the system's risk thresholds are maintained over time.

FIG. 3 is a schematic diagram of an exchange of data between two devices, according to various examples. The diagram depicts the hands of two individuals, each wearing a device—wearable device 302 and wearable device 304—potentially engaged in the preliminary motions of a handshake. The wearable devices may include network interfaces to communicate with each other using short-range communication 306, such as Near Field Communication (NFC). In various examples, the individuals associated with the wearable device 302 and the wearable device 304 may have initiated (or are about to initiate) a transfer request using the electronic service app 130 with the transfer amount exceeding a threshold transfer limit. Accordingly, a geographic location override action may be performed to override the threshold transfer limit.

In a first geographic location override action, wearable device 302 and wearable device 304 may utilize NFC to exchange tokens that encapsulate their respective device identifiers—device identifier 308 and device identifier 312. These identifiers serve as a digital acknowledgment of the physical proximity of the parties involved in the transaction. The exchange of device identifiers can be relayed to the application server 102, either directly from the wearable devices or via an intermediary client device (e.g., client device 104), which then communicates with the application server 102. If a client device is used as an intermediary, its device identifier may also be transmitted.

The location detection component 122, upon receiving the device identifiers, proceeds to query the data store 116 or user accounts 118 to verify that the device identifiers correspond to the user accounts of the parties engaged in the financial transaction. For example, when a transfer request is initiated via the API, it may include user account identifiers for the sender and the receiver, an amount for the transfer protocol component 120, and a device identifier for the client device initiating the request as described previously.

The location detection component 122 may compare the device identifiers transmitted by the wearable devices/client devices with the device identifier included in the transfer request. A match between these identifiers confirms that the wearable devices/client devices are linked to the user accounts actively engaged in the transaction. Further validation is performed by cross-referencing the device identifiers with the user accounts 118 stored within the data store 116. This may ensure that the wearable devices are recognized as trusted devices for the respective user accounts.

Once the correlation is confirmed, the risk component 124 may receive a message that the geographic location override action associated with the ongoing transaction request has been completed. In response, the risk component 124 may transmit a message such as described in override user interface 200 and modify a transfer limit in alignment with the user's choice within the override options 206.

The scenario above describes the exchange of device identifiers of wearable devices, but a similar exchange of identifiers may be made using non-wearable devices. For example, both users may have mobile phones and perform a token exchange using NFC between the two mobile phones. In various examples, user identifier tokens may be exchanged in addition to the device identifiers (or instead of). Each user may be a user identifier token stored with their respective user accounts. Accordingly, the location detection component 122 may query the user accounts to determine if the user identifier tokens match the user accounts involved in the transfer.

Upon successful verification, this proximity-based authentication triggers the application server 102 to transmit the override user interface 200 to the initiating user's client device. The override user interface 200 presents the user with options to temporarily lift the transaction limit, thereby facilitating the completion of the transaction without the constraints of standard limits.

Another geographic location override action may be gesture-based. For example, sensor data 310 and 314 from each wearable device may be processed by a client device to detect a handshake gesture. This sensor data may include motion or orientation information that indicates a mutual handshake when synchronized with a similar gesture detected by the other wearable device. If both devices register a handshake gesture concurrently and detect each other's presence via NFC, this gestural data, coupled with the proximity confirmation and device identifiers, provides a multi-factor authentication mechanism. In various examples, the handshake gesture is classified as a handshake using a gesture detection API on the client devices.

The location detection component 122, utilizing the gestural and proximity data, performs a similar verification process as described previously. For example, upon validation, the application server 102 may transmit override user interface 200 on the initiating user's client device.

FIG. 4 is an illustration of scanning a graphical identifier, according to various examples. In addition to gesture-based and communication-based geographic location override actions, a user may perform an optical-based geographic location override action, such as by using a camera of one device to scan a graphical identifier presented on another device. In this scenario, client device 402 presents a message prompting the user to scan a graphical account identifier 406 (e.g., a QR code or barcode) to confirm the identity of the transfer recipient. In various examples, a user of the client device 404 may select an option within electronic service app 130 to display the graphical account identifier 406, which may be a unique code associated with the recipient's user account in the user accounts 118.

Each user account within the system may be assigned a unique identity token (e.g., user identifier token), which can be dynamically generated as a graphical identifier, such as a QR code. This graphical identifier is securely linked to the user's account information stored within the data store 116 and may be displayed on the user's client device upon request. When a user initiates a transaction that requires a geographic location override, the application server 102 can instruct the recipient's client device 404 to display its graphical account identifier 406 while prompting the sender's client device 402 to scan the displayed code.

The scanning process may include the sender's client device 402 capturing the graphical identifier 406 using its built-in camera or other scanning hardware. The captured information, which encapsulates the recipient's identity token, is then transmitted to the application server 102 via API 114. The application server 102 processes the scanned data to extract the identity token (e.g., decodes the graphical account identifier 406) and matches it against the user accounts 118 in the data store 116. A successful match confirms that the recipient's client device 404 is in close proximity to the sender's client device 402.

In various examples, the graphical account identifier 406 is encoded with a URL that includes the identity token. When the client device 402 scans the graphical account identifier 406 and opens the URL the URL request may be received by the web server 108 of the application server 102. Accordingly, if the URL is activated within a threshold time (e.g., five minutes) of when the graphical account identifier 406 is presented, the application server 102 may assume that the client device 402 is the device that scanned the graphical account identifier 406. As an additional authentication check, the web server 108 may use a device identifier of the client device that requested the URL. When the device identifier of the URL request matches the device identifier of the client device 402 it may be further proof that the client device 402 and the client device 404 are within close proximity to each other.

Upon verification of the recipient's identity and the proximity of the devices, the application server 102 can proceed to authorize the transaction. The risk component 124 is notified of the successful geographic location override, which allows it to adjust the transaction limits accordingly.

In various examples, the application server 102 may be configured with differing degrees of automation and user interaction. For instance, the electronic service app 130 may passively monitor for proximate devices utilizing NFC technology. When a recognized device is within range (e.g., detected), the electronic service app 130 may transmit the detection (and the device identifier) to the application server 102. Consequently, if a user then initiates a transfer request that exceeds the threshold transfer limit and matches a user account with the prior received device identifier, the application server 102 may present an interface such as override user interface 200 without further location verification action by the user.

The application server 102 may adopt a more reactive approach in various examples. In such cases, the risk component 124 may remain inactive until a transfer request exceeding the threshold limit is detected. Then, the requesting client device may be presented with a message detailing potential override actions. The user may then choose to execute an override by engaging in a physical action, such as tapping their device against another to exchange tokens or by scanning a QR code displayed on the recipient's device.

In various examples, the application server 102 may leverage GPS capabilities to ascertain the proximity of users. Upon initiating a transfer and detecting that the users are within a predefined geographic boundary, the electronic service app 130 may present the override user interface 200.

Figure 5:
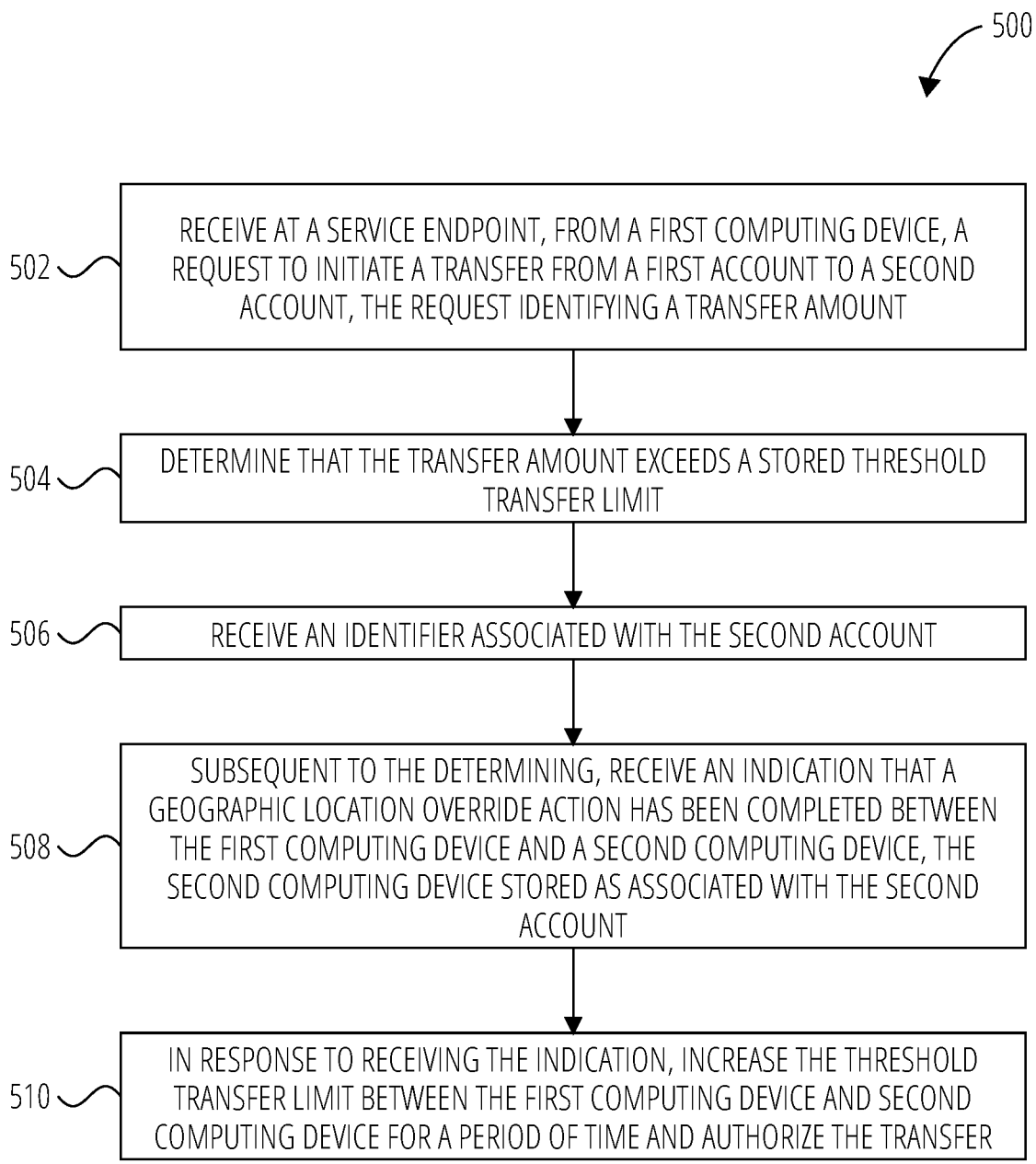
FIG. 5 is a flowchart illustrating a method to override a transfer limit based on geographic proximity of computing devices.

FIG. 5 is a flowchart illustrating a method to override a transfer limit based on geographic proximity of computing devices. The method is represented as a set of blocks that describe operations 502 to operation 510. The method may be embodied in a set of instructions stored in at least one computer-readable storage device of a computing device. A computer-readable storage device excludes transitory signals. In contrast, a signal-bearing medium may include such transitory signals. A machine-readable medium may be a computer-readable storage device or a signal-bearing medium. A processing unit, which executing the set of instructions, may configure the processing unit to perform the operations illustrated in FIG. 5. The processing unit may instruct other component of a computing device to carry out the set of instructions. For example, the processing unit may instruct a network device to transmit data to another computing device or the computing device may provide data over a display interface to present a user interface. In some examples, performance of the method may be split across multiple computing devices using a shared computing infrastructure (e.g., the processing unit encompasses multiple distributed computing devices). The method may be implemented using application server 102.

In operation 502, method 500 receives, using a processing unit at a service endpoint, from a first computing device a request to initiate a transfer from a first account to a second account, the request identifying a transfer amount. The service endpoint may be API 114 at application server 102, in various examples, and be processed by transfer protocol component 120. The first computing device may be a device such as client device 104.

In operation 504, method 500 determines, using the processing unit, that the transfer amount exceeds a stored threshold transfer limit. For example, risk component 124 may compared the transfer amount to a daily threshold transfer limit that exists for all accounts.

In operation 506, method 500 receives an identifier associated with the second account. The identifier may be a user identifier token as discussed with respect to FIG. 4. For example, the user identifier token may have been encoded in a graphical account identifier that was presented on the second computing device and captured by the first computing device. In another example, the user identifier token may have been received over an NFC connection between the first computing device and the second computing device.

In operation 508, method 500 subsequent to the determining, receives, using the processing unit, an indication that a geographic location override action has been completed between the first computing device and a second computing device, the second computing device stored as associated with the second account. The geographic location override action may be gesture-based, communication-based, or optical-based geographic location override action as discussed.

The indication may differ depending on the geographic location override action. For example, an optical-based geographic location override action is used, the indication may be receiving a URL request that corresponds to an encoded URL in a QR code. If the geographic location override action is gesture-based the indication may receiving gesture data that is classified as a handshake from two computer devices within a threshold amount of time (e.g., 5 seconds). If the geographic location override action is communication-based, the indication may be receiving the user identifier token of the second account from the first computing device. The indication may be receiving an API call from the first and second computing devices that the user identifier token was transmitted via an NFC connection.

In various examples, after determining that amount of the transfer exceeds the threshold transfer limit, a message may be presented on the first computing device identifying the geographic location override action to complete. For example, a message may be presented that indicates amount of the transfer exceeds the threshold transfer limit but that if the user scans a QR code presented on a device associated with the second account the limit may be increased.

In various examples, the method may further include confirming a distance between a location of the first computing device and a location of second computing device is less than a threshold distance. For example, the locations of the first computing device and second computing device may be received (e.g., via electronic service app 130 from a GPS sensor). The threshold distance may be larger than the accuracy range of the location data received. Accordingly, if the GPS sensor has a possible error range of 50 ft, the threshold distance may be at least 50 ft.

In operation 510, method 500 in response to receiving the indication, increases the threshold transfer limit between the first computing device and second computing device for a period of time and authorizes the transfer. For example, increasing the transfer limit may include storing an override entry in a data store identifying the first account and the second account and a duration of the period of time. The duration may be set according to a selection made in an override user interface such as discussed in FIG. 2.

Figure 6:
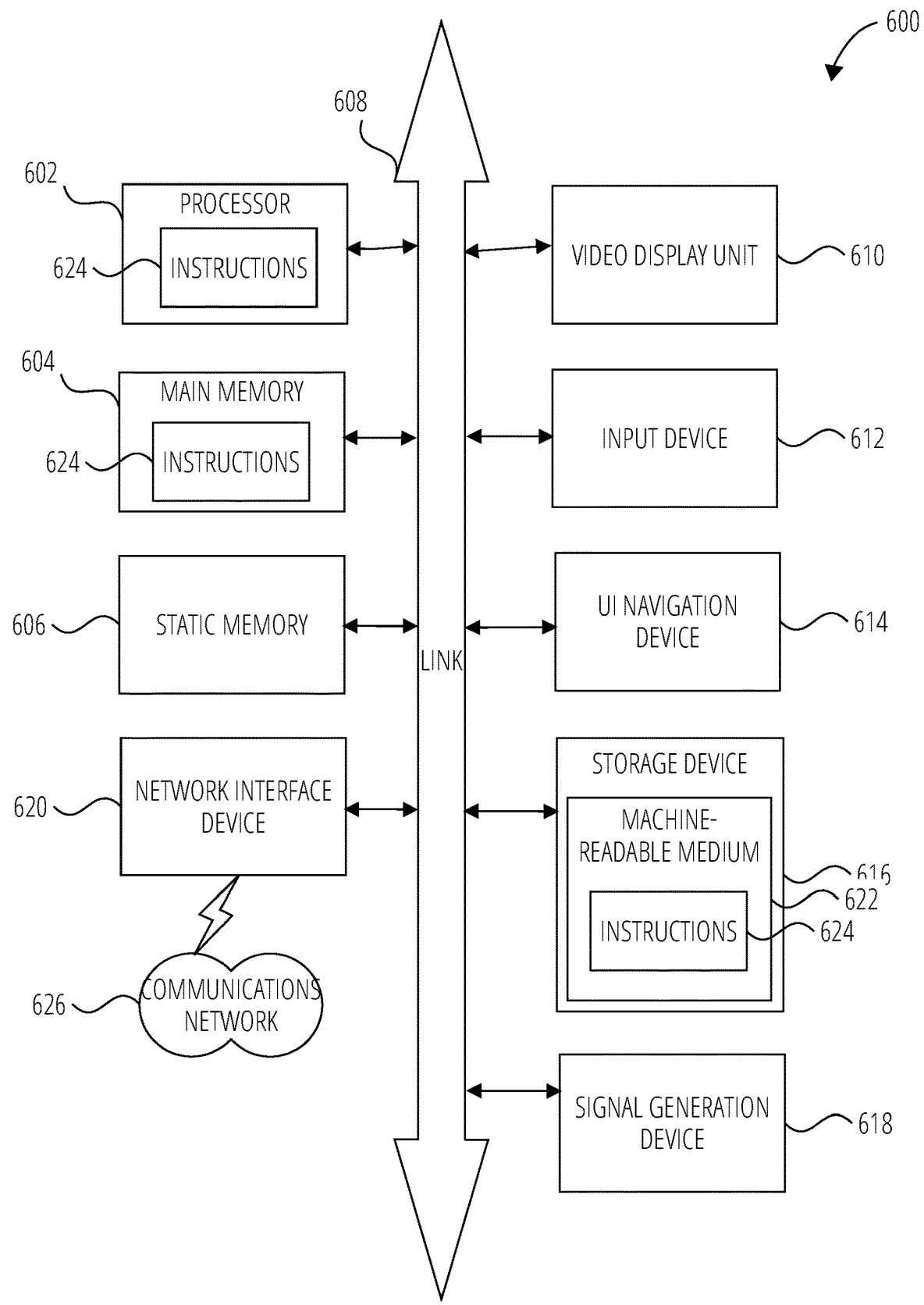
FIG. 6 is a block diagram illustrating a machine in the example form of computer system 600, within which a set or sequence of instructions may be executed to cause the machine to perform any one of the methodologies discussed herein, according to various examples.

FIG. 6 is a block diagram illustrating a machine in the example form of computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608. The computer system 600 may further include a video display unit 610, an input device 612 (e.g., a keyboard), and a user interface UI navigation device 614 (e.g., a mouse). In one embodiment, the video display unit 610, input device 612, and UI navigation device 614 are incorporated into a single device housing such as a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensors.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed Database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 622 that excluded transitory signals.

The instructions 624 may further be transmitted or received over a communications network 626 using a transmission medium via the network interface device 620 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receiving from a first computing device, using a processing unit at a service endpoint, a request to initiate a transfer from a first account to a second account, the request identifying a transfer amount;
   determining, using the processing unit, that the transfer amount exceeds a stored threshold transfer limit;
   receiving an identifier associated with the second account;
   subsequent to the determining, receiving, using the processing unit, an indication that a geographic location override action has been completed between the first computing device and a second computing device, the second computing device linked as associated with the second account; and
   in response to receiving the indication, increasing the threshold transfer limit between the first computing device and second computing device for a period of time and authorizing the transfer.

2. The method of claim 1, wherein the identifier associated with the second account is a user identifier token.

3. The method of claim 2, wherein receiving the indication that the geographic location override action has been completed includes:
receiving the user identifier token from the first computing device.

4. The method of claim 1, further comprising:
presenting a message on the first computing device identifying the geographic location override action to complete.

5. The method of claim 1, wherein increasing the threshold transfer limit between the first computing device and the second computing device for the period of time comprises:
storing an override entry in a data store identifying the first account and the second account and a duration of the period of time.

6. The method of claim 1, further comprising:
confirming a distance between a location of the first computing device and a location of second computing device is less than a threshold distance.

7. The method of claim 6, wherein the confirming is based on receiving an indication the first computing device and the second computing device communicated with each other using a near field communication protocol.

8. The method of claim 6, wherein confirming the distance includes:
receiving the location of the first computing device; and
receiving the location of the second computing device.

9. A non-transitory computer-readable medium comprising instructions, which when executed by a processing unit, configure the processing unit to perform operations comprising:
receiving from a first computing device, at a service endpoint, a request to initiate a transfer from a first account to a second account, the request identifying a transfer amount;
determining that the transfer amount exceeds a stored threshold transfer limit;
receiving an identifier associated with the second account;
subsequent to the determining, receiving an indication that a geographic location override action has been completed between the first computing device and a second computing device, the second computing device linked as associated with the second account; and
in response to receiving the indication, increasing the threshold transfer limit between the first computing device and second computing device for a period of time and authorizing the transfer.

10. The non-transitory computer-readable medium of claim 9, wherein the identifier associated with the second account is a user identifier token.

11. The non-transitory computer-readable medium of claim 10, wherein receiving the indication that the geographic location override action has been completed includes:
receiving the user identifier token from the first computing device.

12. The non-transitory computer-readable medium of claim 9, wherein the instructions, which when executed by the processing unit, further configure the processing unit to perform operations comprising:
presenting a message on the first computing device identifying the geographic location override action to complete.

13. The non-transitory computer-readable medium of claim 9, wherein increasing the threshold transfer limit between the first computing device and the second computing device for the period of time comprises:
storing an override entry in a data store identifying the first account and the second account and a duration of the period of time.

14. The non-transitory computer-readable medium of claim 9, wherein the instructions, which when executed by the processing unit, further configure the processing unit to perform operations comprising:
confirming a distance between a location of the first computing device and a location of second computing device is less than a threshold distance.

15. The non-transitory computer-readable medium of claim 14, wherein the confirming is based on receiving an indication the first computing device and the second computing device communicated with each other using a near field communication protocol.

16. The non-transitory computer-readable medium of claim 14, wherein confirming the distance includes:
receiving the location of the first computing device; and
receiving the location of the second computing device.

17. A system comprising:
a processing unit; and
a storage device comprising instructions, which when executed by the processing unit, configure the processing unit to perform operations comprising:
receiving from a first computing device, at a service endpoint, a request to initiate a transfer from a first account to a second account, the request identifying a transfer amount;
determining that the transfer amount exceeds a stored threshold transfer limit;
receiving an identifier associated with the second account;
subsequent to the determining, receiving an indication that a geographic location override action has been completed between the first computing device and a second computing device, the second computing device linked as associated with the second account; and
in response to receiving the indication, increasing the threshold transfer limit between the first computing device and second computing device for a period of time and authorizing the transfer.

18. The system of claim 17, wherein the identifier associated with the second account is a user identifier token.

19. The system of claim 18, wherein receiving the indication that the geographic location override action has been completed includes:
receiving the user identifier token from the first computing device.

20. The system of claim 17, wherein the instructions, which when executed by the processing unit, further configure the processing unit to perform operations comprising:
presenting a message on the first computing device identifying the geographic location override action to complete.

* * * * *